Sept. 2, 1958  A. KEEFE  2,850,069
INFLATABLE CHAMBER FOR PNEUMATIC TIRES
Original Filed May 7, 1952  2 Sheets-Sheet 1
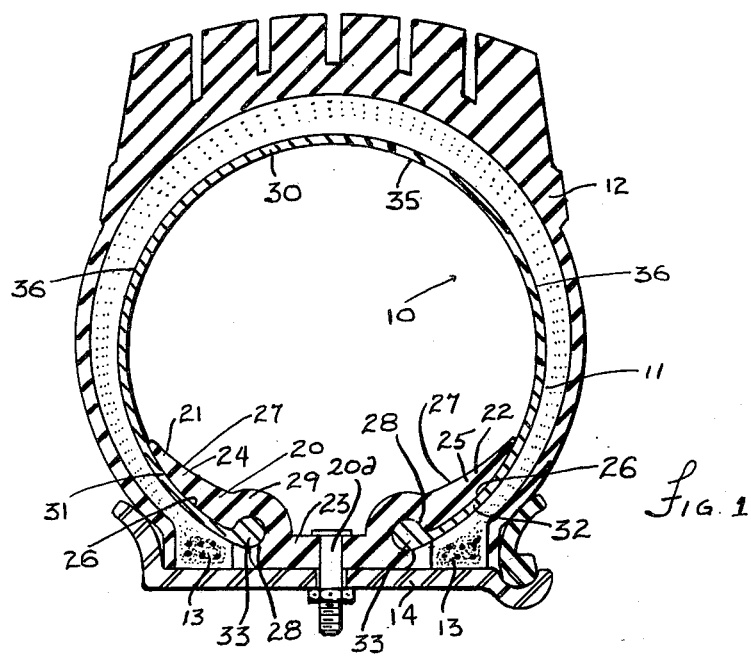
Fig. 1
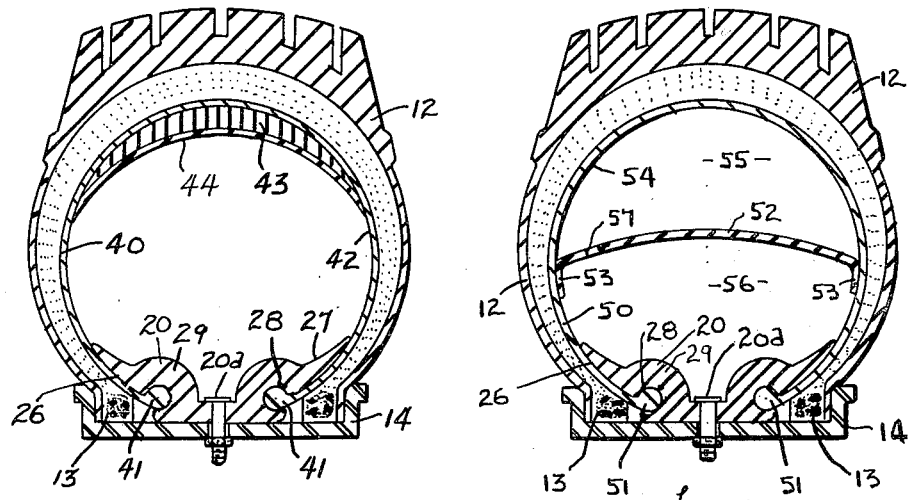
Fig. 2
Fig. 3
ARTHUR KEEFE
INVENTOR
By J. William Freeman
ATTORNEY Sept. 2, 1958          A. KEEFE          2,850,069

INFLATABLE CHAMBER FOR PNEUMATIC TIRES

Original Filed May 7, 1952          2 Sheets—Sheet 2

ARTHUR KEEFE
INVENTOR

J. William Freeman

ATTORNEY though the fact that the inner tube is inaccessible for repair or alteration.

United States Patent Office 2,850,069
Patented Sept. 2, 1958

2,850,069

INFLATABLE CHAMBER FOR PNEUMATIC TIRES

Arthur Keefe, Akron, Ohio

Continuation of application Serial No. 286,450, May 7, 1952. This application April 24, 1957, Serial No. 656,176

10 Claims. (Cl. 152—349)

This invention relates to pneumatic tires and in particular relates to a new and novel resilient inflatable chamber designed to replace the conventional inner tube employed in pneumatic tires.

Conventional inner tubes, while meeting with widespread commercial acceptance for the past several years, have nevertheless possessed certain disadvantages due primarily to the fact that the inner surface of the endless annular tube is inaccessible for repair or alteration.

As an example of how this basic structure of the inner tube can operate to a definite disadvantage, one need only consider the known methods of repairing a punctured tube, wherein a patch is secured to the outer surface of the inner tube by means of adhesives applied to the area adjacent the puncture. Because the pressure of the entrapped air within the inner tube during use, is always exerted directly against the patch, it is manifest that this pressure continually tends to force the patch out of engagement with the tube itself. Accordingly, all improvements in this regard have been directed towards increasing the strength of the bond between the patch and the inner tube itself.

Similarly, because of the pressure above referred to, it has been heretofore impractical to repair, by patching, any large damaged area of a tube with the result that any tube so damaged must be necessarily discarded.

A further disadvantage of the conventional inner tube, which is directly traceable to inability to gain access to the interior surface of the inner tube, is found in the fact that these inner tubes cannot be adapted to include various safety features that have recently been developed in the tire industry.

By way of example, various puncture-sealing compositions have been recently developed for the intended purpose of preventing sudden loss of air when a casing or tube is pierced by a foreign object. Inasmuch as the function of these puncture sealants dictates that the same must be applied to the surface of a tire or tube that is in direct contact with the entrapped air under pressure, it is manifest that the conventional tube could not possibly be altered to include this puncture sealant on the inner surface thereof. Thus, a person desiring to take advantage of this safety device would be compelled to purchase new tubes having the puncture sealant provided on the inner surface thereof during manufacture.

In like manner, it is impossible for an owner of conventional tubes to utilize the same to take advantage of certain recent discoveries wherein a second endless tube is provided within the usual tire tube for the intended purposes of preventing a rapid discharge of air when a puncture is encountered. As before, an owner, desiring this safety feature would have to purchase new tubes manufactured so as to include this feature.

At the present time, it is also impossible for a person having pneumatic tires equipped with inner tubes to use these tubes, or any portion thereof, to convert his tires to essentially tubeless tires.

Accordingly, it is one object of this invention to provide an inflatable chamber having the inner surface thereof accessible for repair or alteration.

It is a further object of this invention to provide an inner tube capable of having relatively large damaged areas thereof replaced without materially affecting the over-all efficiency of the tube.

It is a further object of this invention to provide a basic strip of endless material that is cooperatively engageable with a variable number of replaceable flaps to form a varied number of possible types of inflatable chambers, all of which are capable of replacing a conventional inner tube.

It is a further object of this invention to provide a basic strip of endless material that is capable of use alone in conjunction with a pneumatic tire casing to form a tubeless pneumatic tire.

It is a further object of this invention to provide a basic strip of endless material, adaptable to cooperatively engage interchangeably with any one of several flaps having various safety features incorporated therein, thereby to form an inflatable chamber.

It is a further object of this invention to provide a basic strip of endless material usable with or without cooperatively engageable, interchangeable flaps, to provide a body of entrapped air within a pneumatic casing.

It is a still further object of this invention to provide a two-piece inflatable chamber having the same physical properties of conventional inner tubes.

These and other objects of the invention will become more apparent upon consideration of the following brief specification, taken in the light of the accompanying drawings.

Of the drawings:

Figure 1 is a cross-sectional view illustrating the invention.

Figure 2 is a cross-sectional view illustrating a different adaptation of the invention.

Figure 3 is a cross-sectional view illustrating a still different adaptation of the invention.

Figure 4:
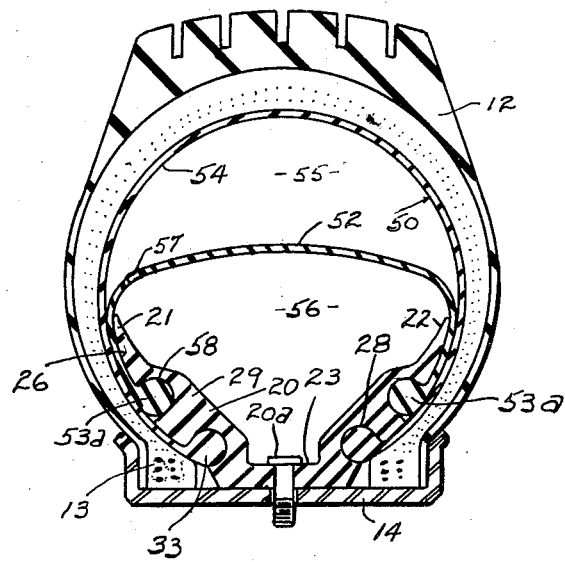
Figure 4 is a view illustrating a modified form of the device shown in Figure 3.

Referring now to the drawings, and in particular to Figures 1 to 4 thereof, the improved inflatable chamber, generally indicated as 10, is shown positioned in fully-inflated condition against the interiorly-presented surface 11 of a standard pneumatic tire casing 12, that has the bead portions 13, 13 thereof, mounted in known manner, on an endless flanged tire rim 14 of conventional construction.

Although the improved inflatable chamber 10, as a whole, is capable of replacing a conventional inner tube, the attainment of the previously mentioned objects of this invention is made possible by the divided construction of the chamber 10, wherein a flexible endless strip 20 has the area adjacent the edge portions 21 and 22 thereof cooperatively engageable with an area adjacent the respective edge portions 31 and 32 of a preformed resilient endless flap 30 to form the assembled inflatable chamber 10.

While the inherent resiliency of the flexible strip 20 dictates that the same may assume a variety of shapes, the same is shown in Figure 1 as being distorted to include a central base portion 23 engageable with the rim 14 and having essentially concavo-convex wing portions 24 and 25 extending outwardly from opposite sides thereof to present convex surfaces 26, 26 and concave surfaces 27, 27. For purposes to be described, the convex surfaces 26, 26 may be provided with circumferentially-extending grooves 28, 28, which grooves, for the purpose of maintaining uniformity of thickness in the wing sections, necessitate provision of circumferentially-extending protuberances 29, 29 on the concave surfaces 27, 27. A valve stem 20a, incorporated in the central base portion 23 in known manner, is provided to permit the entrance of air into the fully-assembled inflatable chamber 10.

To the end of providing a cooperating member that will be engageable with the strip 20 to form a fully-assembled inflatable chamber 10, there is provided a preformed flap 30, of endless resilient material, having the opposed edge portions thereof provided with circumferentially-extending rib portions 33, 33, the cross-sectional diameter of said ribs being such that the same may be received in the circumferentially-extending grooves 28, 28 provided on the convex surfaces 26, 26 of the wing portions 24 and 25, respectively. (See Figure 1.) By this method of joining, the flap 30 and the strip 20 combine to form a chamber 10, having an interior surface defined by the surfaces 27 and 35 of the strip 20 and flap 30, respectively, and having an exterior casing-engaging surface defined by the surfaces 27 and 35 of the strip 20 and flap 30, respectively, and having an exterior casing-engaging surface defined by the surfaces 26 and 36 of the strip 20 and flap 30, respectively.

While the above mentioned and described manner of engagement between the strip 20 and the flap 30 will be found to give satisfactory results in the majority of cases, it is manifest that in extreme cases, an adhesive substance (not shown) could be placed within the grooves 28, 28 thereby increasing the permanence of bond between the ribs 33 and the grooves 28 of the flap 30 and the strip 20, respectively.

In use or operation of the improved inflatable chamber 10 as an inner tube for a standard pneumatic casing 12, the same is first assembled into a unit by engaging the circumferentially-extending rib portions 33 within the circumferentially-extending grooves 28 provided on the convex surfaces 26, 26 of the wing portions 24 and 25, respectively. In this condition, the uninflated chamber 10 may then be positioned within the pneumatic casing in much the same manner employed in conjunction with the installation of the standard inner tube. With the chamber 10 thus positioned, the same may then be inflated to the condition of Figure 1 by causing the introduction of air into the interior of the chamber 10 through the valve 20a.

In the event of a puncture of the flap 30 of the chamber 10 by a foreign object during use, it is manifest that efficient repair may be facilitated by first removing the chamber 10 from the casing 12 and then causing a subsequent separation of the flap 30 from the strip 20, whereupon the flap 30 may have a patch (not shown) applied to the normally inaccessible interior surface 35 thereof. If the flap 30 is damaged beyond repair it is manifest that a new preformed flap 30 may be substituted without the incurrence of the expense of replacing the entire inflatable chamber.

Thus, it can be seen from the foregoing that these has been provided a new and novel type of inflatable chamber, the divided construction of which makes possible efficient repair upon the normally inaccessible interior surface 35. It can also be seen from the foregoing how severe damage to the inflatable chamber does not render undamaged component parts unusable because of this feature of divided construction.

Figure 2 illustrates how a modified flap 40 may be interchangeably employed in conjunction with the basic strip 20, and accordingly like members indicate like parts previously described in conjunction with Figure 1. In Figure 2, the preformed flap 40, of endless material, is provided with opposed edge portions defined by circumferentially-extending ribs 41, 41 which are receivable within the circumferentially-extending grooves 28, 28 provided on the convex surface 26 of the strip 20. For the purpose of utilizing the safety principle of self-sealing tubes, the inner surface 42 of the flap 40 may have applied thereto a puncture-sealing composition 43, the consistency of which is such that if the flap 40 is punctured by a nail (not shown), the composition 43 will adhere to the same and will prevent the escape of air, and will flow into and seal the puncture when the instrument is withdrawn. Although the composition 43 is of such consistency that it will normally adhere to the inner surface 42 of the flap 40, it is manifest that an auxiliary flap 44 may be positioned within the flap 40 to secure the positioning of the composition 43. (See Figure 2.) Because the above referred to composition 43 may be applied at a time subsequent to purchase of the inflatable chamber, it will be seen that the standard preformed flap 30 described in Figure 1, may be altered to include this principle of safety inherent with self-sealing tubes. In a manner similar to that employed in connection with the device shown in Figure 1, it is manifest that the connection between the flap 40 and the strip 20 could be reinforced by the use of an adhesive substance (not shown) between the surface 26 and 42 of the strip 20 and the flap 40 respectively.

By like token, in Figure 3, there is illustrated a modified flap 50, having the edge portions thereof provided with circumferentially-extending ribs 51, 51 receivable within correspondingly shaped, circumferentially-extending grooves 28, 28 provided in the convex surface 26 of the strip 20. In this modified form of the invention, a second auxiliary flap 52 of endless non-resilient material, has the edge portions 53, 53 thereof, fixedly secured to the inner surface 54 of the flap 50. In this manner the inflatable chamber 10 is divided into two sub-chambers 55 and 56; passage of air between these chambers 55 and 56 being facilitated and controlled by provision of flutter valve 57 of known construction.

While the auxiliary flap 52 is shown in Figure 3, as having the edge-portions 53, 53 fixedly secured to the inner surface 54 of the flap 50, it is manifest that the same could be provided with edge-portions shaped in the form of ribs 53a, 53a capable of reception with a second set of circumferentially-extending grooves 58, 58 provided adjacent the grooves 28 of the strip 20. (See Figure 4.)

In each of the above cases, the flaps 30, and 40 and 50 respectively have been described as mating interchangeably with a standard strip 20. However, in many cases, and particularly in cases where the casing is designed for operation without a tube, it is manifest that the flaps above described could be used to a definite advantage on a single unit by merely providing an adhesive between the interior surface 11 of the casing and the exteriorly presented surface of the flap which is positioned against the casing 11. It is manifest that under these circumstances, wherein the use of the strip 20 is eliminated, that the effectivity of the seal could be increased by the presence of substantially circumferentially extending irregularities, such as grooves or ribs (not shown), provided on either or both the surface 11 or the exteriorly presented surface of the respective flaps.

While the Figures 1 to 4 have shown how a variety of flaps 30, 40 and 50 can be interchangeably employed with the basis strip 20, it is apparent that the inherent resiliency of the strip 20 dictates that the same could be used, alone, in conjunction with a pneumatic tire casing to provide the requisite amount of entrapped air within said casing.

Figure 5:
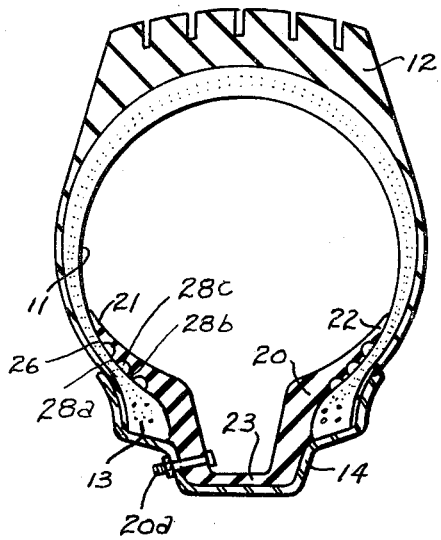
Figure 5 is a sectional view of a modified form of the invention for use in conjunction with tubeless tires.

Accordingly, in Figure 5 of the strip 20 is shown mounted on the rim 14 with the convex surface 26 thereof engaging the interior 11 of the casing 12 at an area adjacent the bead portions 13, 13. Because the flexible strip 20 is distorted to the essentially concavo-convex shape shown in Figure 5, the inherent resiliency thereof causes the edge portions 21, 22 thereof to be pressed against the surface 11 in air-tight relationship. This factor, coupled with auxiliary pressure afforded by the entrapped air under pressure, insures an air-tight seal between the strip 20 and the casing 12. In extreme cases, however, the sealing action above described may be further supplemented by the use of an adhesive sealing (not shown) provided between the convex surface 26 of the flap 20 and the surface 11 of the casing 12. As before, the effectivity of this seal may be increased by the presence of auxiliary circumferentially extending irregularities 28a, which may define ribs 28b and grooves 28c for reception of the adhesive substance (not shown).

Figure 6:
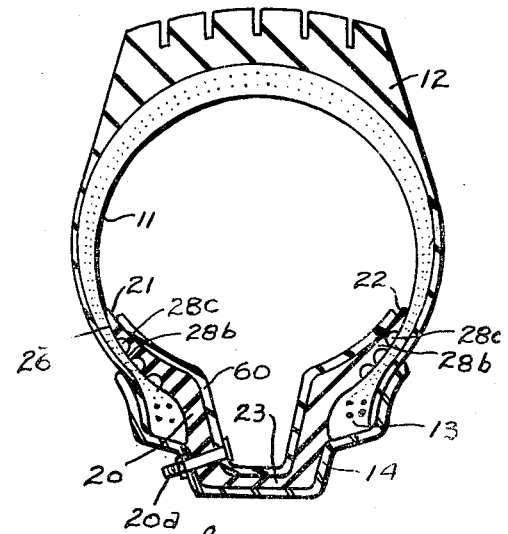
Figure 6 illustrates a further modification of the invention.

In Figure 6, a modification of the principle described in connection with Figure 5 is illustrated. This modification, designed for exceptionally hard usage, such as on truck tires, features the use of an auxiliary strip 60 having relatively greater resistance to distortion than the strip 20 and therefore being capable of increasing the amount of pressure exerted by the edge portions 21, 22 against the surface 11 of the casing 12. It is manifest that while the strip 60 is shown as being separate and distinct from the strip 20, the same could be embedded within the strip 20 without the exercise of invention.

Other modifications, such as the use of a metallic material in all or any portion of the strip 20, can be resorted to without departing from the spirit of this invention or the scope of the appended claims.

This application is a continuation of copending application Serial No. 286,450, filed May 7, 1952, now abandoned, by Arthur Keefe.

What is claimed is:

1. An inflatable tube for pneumatic tires, comprising; a first endless piece of resilient material of substantially concavo-convex configuration; a second endless piece of resilient material having the opposite edge portions thereof secured in overlapping relationship with the edge portions of said first-mentioned endless piece of material to define therewith an endless inflatable chamber; a valve mounted in said first mentioned endless piece of material for controlling the entrance and discharge of air from said chamber; and means operable to retain said respective edge portions of said first and second endless pieces in secured relationship upon inflation of said chamber through said valve; said means including a releasable interlock between said respective opposed edge portions thereof; the exterior surface of said chamber, as defined at the point of juncture between said first and second endless pieces, being substantially uninterrupted in contour, whereby said exterior surface of said chamber may be positioned against the internal wall of a pneumatic tire casing; said means including at least one substantially projecting rib on each opposed edge portion of said second-mentioned endless piece of material, and cooperatively engageable grooves provided on the abutting surfaces of said first-mentioned endless piece of material.

2. An inflatable tube for pneumatic tires, comprising; a first endless piece of resilient material of substantially conacvo-convex configuration; a second endless piece of resilient material having the opposite edge portions thereof secured in overlapping relationship with the edge portions of said first mentioned endless piece of material to define therewith an endless inflatable chamber; a valve mounted in said first-mentioned endless piece of material for controlling the entrance and discharge of air from said chamber; and means operable to retain said respective edge portions of said first and second endless pieces in secured relationship upon inflation of said chamber through said valve; said means including a releasable interlock between said respective opposed edge portions thereof; the exterior surface of said chamber, as defined at the point of juncture between said first and second endless pieces, being substantially uninterrupted in contour, whereby said exterior surface of said chamber may be positioned against the internal wall of a pneumatic tire casing; said means including at least one substantially projecting rib provided adjacent each of the opposed edge portions of said first-mentioned endless piece of material, and cooperatively engageable grooves provided adjacent the opposed edge portions of said second-mentioned endless piece of material.

3. The device of claim 1 further characterized by the fact that said endless inflatable chamber is subdivided into a pair of annular sub-chambers, by a third endless strip of material having the edge portions thereof secured to opposed surfaces of one said endless piece.

4. The device of claim 1 further characterized by the fact that said endless inflatable chamber is subdivided into a pair of annular sub-chambers, by a third endless strip of material having the edge portions thereof secured between the overlapped edge portions of said first and second endless pieces.

5. The device of claim 3 further characterized by the fact that said third endless piece has a valve therethrough.

6. The device of claim 4 further characterized by the fact that said third endless piece has a valve therethrough.

7. The device of claim 1 further characterized by the fact that said second endless piece has a thickened central portion defined by a layer of puncture sealant material.

8. The device of claim 3 further characterized by the fact that said second endless piece has a thickened central portion defined by a layer of puncture sealant material.

9. The device of claim 4 further characterized by the fact that said second endless piece has a thickened central portion defined by a layer of puncture sealant material.

10. The device of claim 5 further characterized by the fact that the said second endless piece has a thickened central portion defined by a layer of puncture sealant material.

References Cited in the file of this patent

UNITED STATES PATENTS

| | | |
|---|---|---|
| 1,261,012 | Demas | Apr. 2, 1918 |
| 1,637,599 | Ballew | Aug. 2, 1927 |
| 1,827,668 | Musselman | Oct. 13, 1931 |
| 1,836,902 | Carnahan | Dec. 11, 1931 |
| 1,886,470 | Daddio | Nov. 8, 1932 |
| 1,889,799 | Clark | Dec. 6, 1932 |
| 2,305,053 | Zimmerman | Dec. 15, 1942 |
| 2,502,213 | Sutton | Nov. 14, 1950 |
| 2,674,292 | Sutton | Apr. 6, 1954 |